United States Patent [19]

Arnold et al.

[11] Patent Number: 4,585,939
[45] Date of Patent: Apr. 29, 1986

[54] MULTI-FUNCTION NATURAL GAMMA RAY LOGGING SYSTEM

[75] Inventors: Dan M. Arnold; Harry D. Smith, Jr., both of Houston, Tex.

[73] Assignee: Halliburton Company, Duncan, Okla.

[21] Appl. No.: 539,764

[22] Filed: Oct. 5, 1983

[51] Int. Cl.⁴ .............................................. G01V 5/06
[52] U.S. Cl. .................................................. 250/256
[58] Field of Search .................. 250/256, 253, 268

[56] References Cited

U.S. PATENT DOCUMENTS

| | | | |
|---|---|---|---|
| 3,662,172 | 5/1972 | Youmans | 250/268 |
| 3,976,878 | 8/1976 | Chevalier et al. | 250/253 |
| 4,492,863 | 1/1985 | Smith, Jr. | 250/256 |

Primary Examiner—Alfred E. Smith
Assistant Examiner—Constantine Hannaher
Attorney, Agent, or Firm—W. J. Beard

[57] ABSTRACT

A multi-function compensated spectral natural gamma ray logging method provides for determining formation and borehole characteristics directly from naturally occurring formation radiation. The method, which measures formation lithology in open holes and mean casing thickness in cased wells, incorporates active compensation for differences in borehole conditions when calculating relative elemental formation abundancies or concentrations of potassium (K), uranium (U) and thorium (T).

11 Claims, 11 Drawing Figures

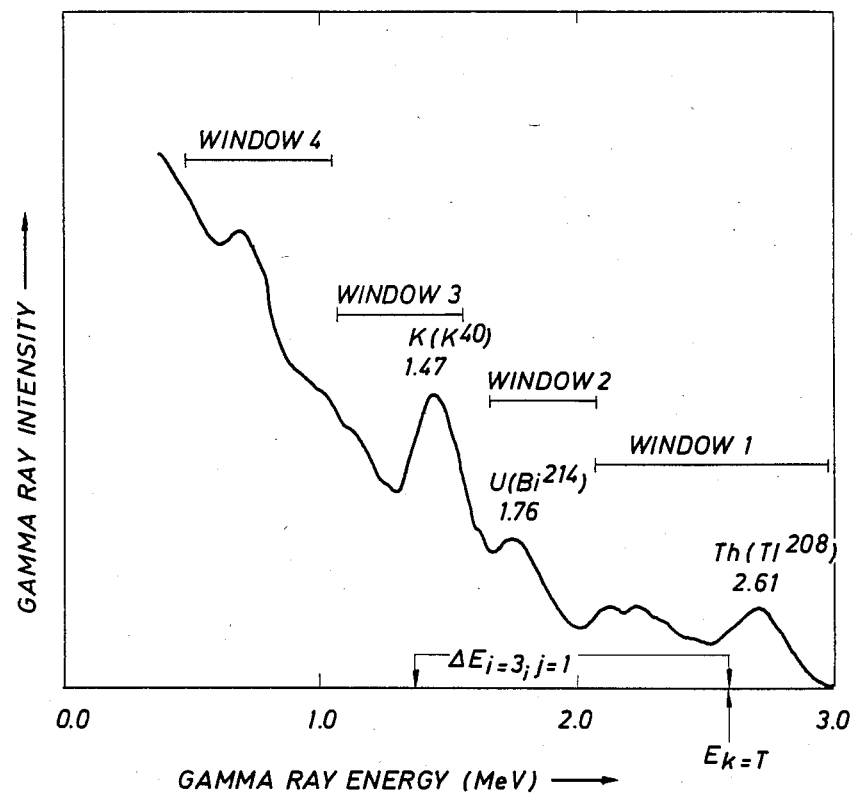
FIG.1 NATURAL GAMMA RAY SPECTRUM
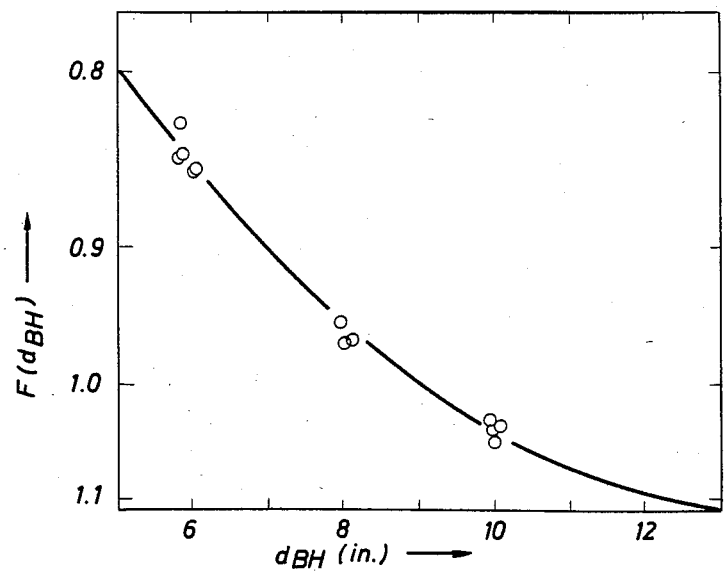
FIG.9 BOREHOLE DIAMETER CORRECTION FOR LITHOLOGY RATIO, $R_{LIT}$.

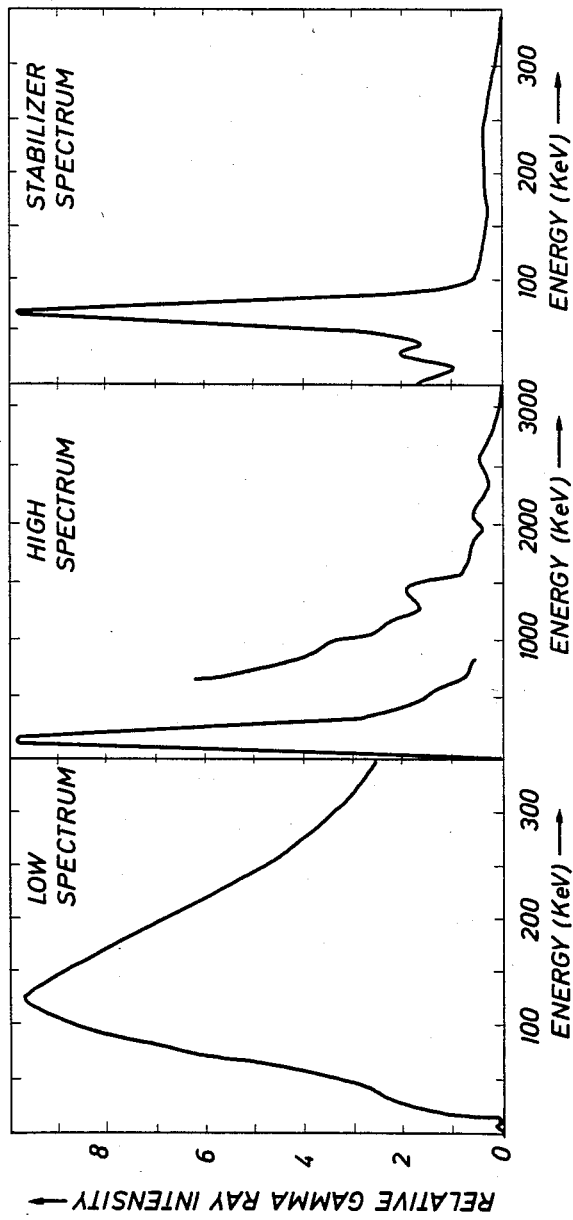
FIG. 3 DIGITIZED SPECTRAL DATA FROM A CASED WELL
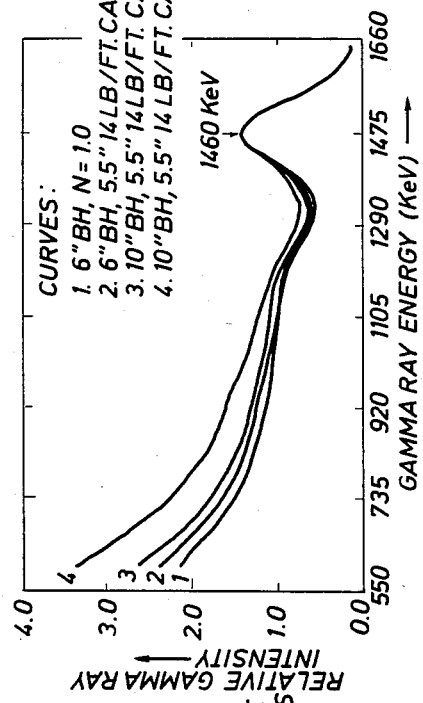
FIG. 4 CHANGES IN SHAPE AND INTENSITY OF HIGH ENERGY FORMATION SPECTRA DUE TO BOREHOLE EFFECTS

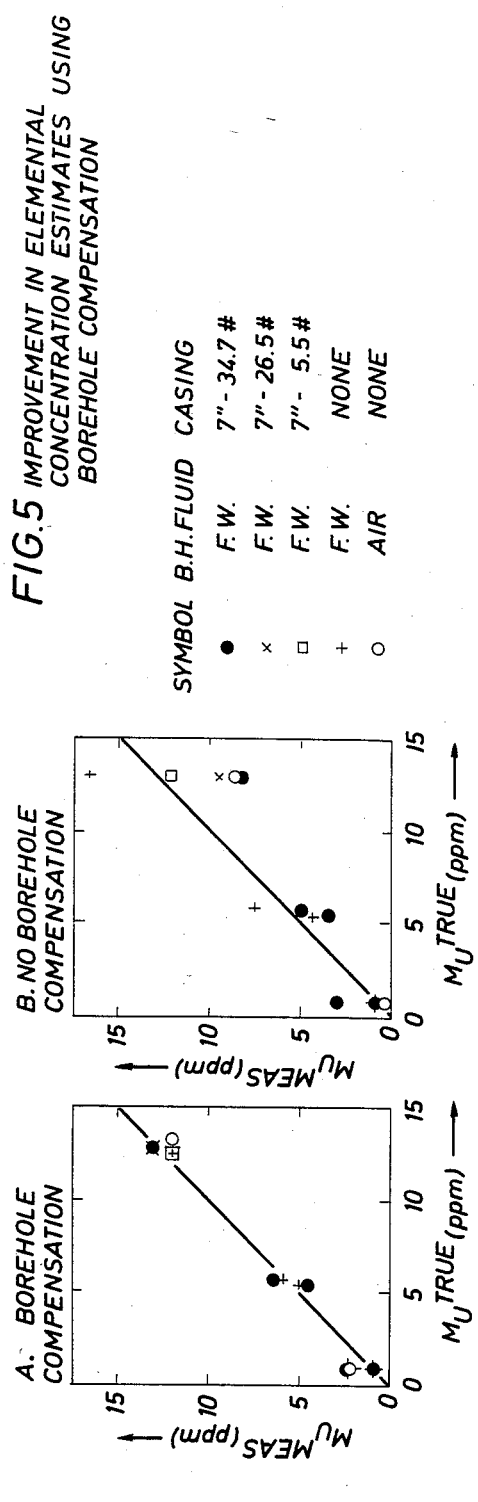
FIG. 5 IMPROVEMENT IN ELEMENTAL CONCENTRATION ESTIMATES USING BOREHOLE COMPENSATION
| SYMBOL | B.H. FLUID | CASING |
|---|---|---|
| ● | F.W. | 7"- 34.7 # |
| × | F.W. | 7"- 26.5 # |
| □ | F.W. | 7"- 5.5 # |
| + | F.W. | NONE |
| ○ | AIR | NONE |
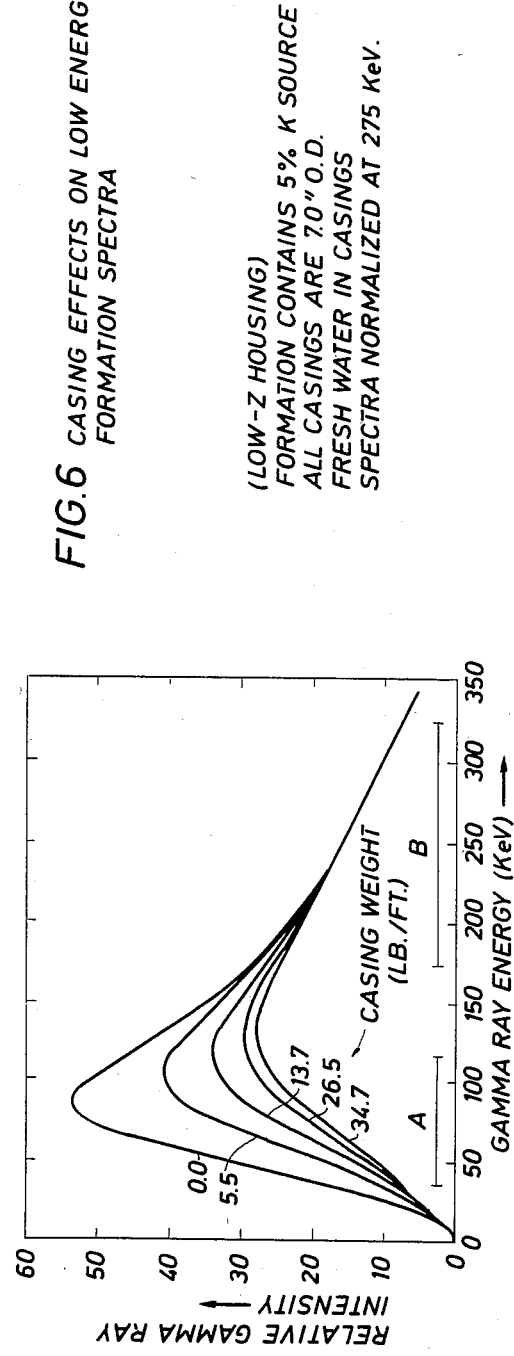
FIG. 6 CASING EFFECTS ON LOW ENERGY FORMATION SPECTRA
(LOW-Z HOUSING)
FORMATION CONTAINS 5% K SOURCE
ALL CASINGS ARE 7.0" O.D.
FRESH WATER IN CASINGS
SPECTRA NORMALIZED AT 275 KeV.

FIG. 7 FUNCTIONAL RELATION BETWEEN CASING RATIO, $R_C$, AND CASING THICKNESS, $t_{CSG}$
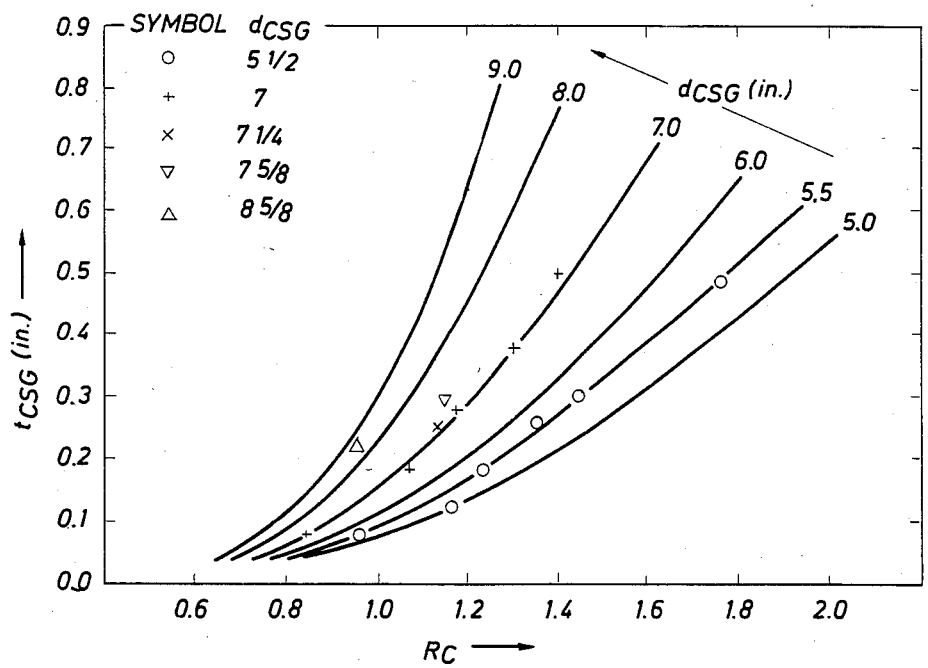
FIG. 8 LITHOLOGY EFFECTS ON LOW ENERGY FORMATION SPECTRA
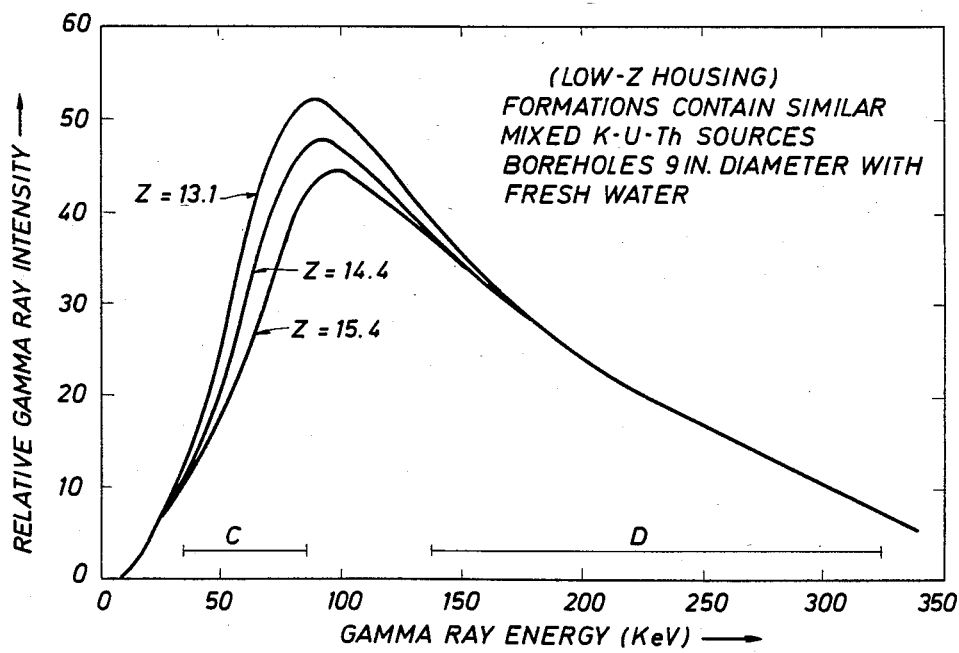

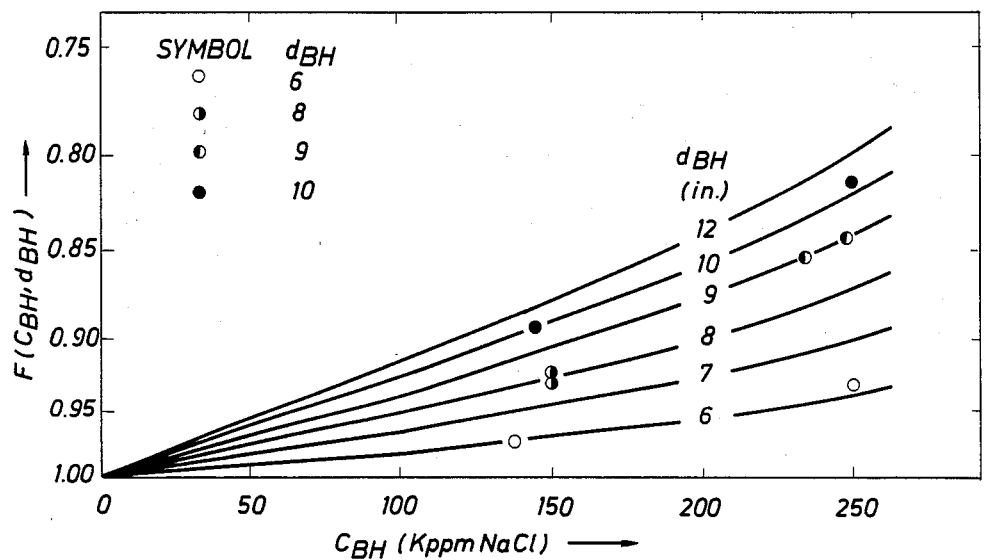
FIG.10 BOREHOLE SALINITY CORRECTION FOR LITHOLOGY RATIO, $R_{LIT}$
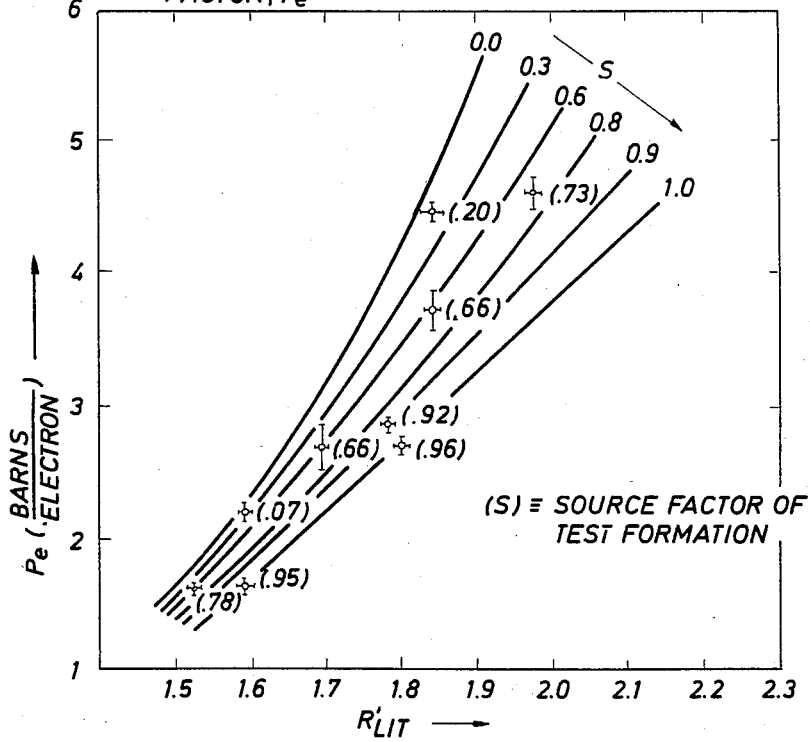
FIG.11 FUNCTIONAL RELATION BETWEEN CORRECTED LITHOLOGY RATIO, $R'_{LIT}$, AND PHOTOELECTRIC FACTOR, $P_e$

MULTI-FUNCTION NATURAL GAMMA RAY LOGGING SYSTEM

BACKGROUND OF THE INVENTION

The present invention relates to methods and apparatus for logging earth formations penetrated by a well borehole, and more particularly to methods for directly determining formation and borehole characteristics by analysis of gamma rays from naturally occurring formation radiation. This includes determining relative elemental abundancies of potassium (K), uranium (U), and thorium (Th), and measuring formation lighology in open holes and casing thickness in cased holes.

In recent years gamma ray spectroscopy of earth formations in the vicinity of a well borehole has been made practical by the development of highly stable scintillation detectors which may be lowered into a well borehole and which produce a pulse height spectrum proportional to the gamma ray energy spectrum of gamma ray impinging upon the scintillation crystal. In one commercially available well logging service for detecting the natural gamma ray spectra produced by uranium, potassium, and thorium in earth formations in the vicinity of a well borehole, three energy ranges or windows are used which are centered about selected gamma ray emission peaks for naturally occurring gamma rays in the decay chain of the aforementioned elements. Gamma ray count rates in each of these three energy ranges are transmitted to the surface and processed by a technique called spectrum stripping wherein standard calibration spectra for each of the individual elements (made in standard boreholes) are applied to the measurements of count rates made in the energy ranges chosen for detecting each of the three elements. So called "stripping constants" derived from the measurement of the standard spectra in standard boreholes for each of the three elements are then applied to the measured spectrum from the unknown earth formations surrounding the borehole. An estimate of the percentages of the particular three elements being measured is then made based on the stripping technique.

In a second, slightly more sophisticated commercially available technique, (such as that described in U.S. Pat. No. 3,976,878 to Chevalier, et al, issued Aug. 24, 1976) five energy ranges or windows are utilized for the measurement of the spectrum of natural gamma rays emitted by the earth formations in the vicinity of a well borehole. The five energy range measurements used in this technique are employed in a least squares fitting scheme to determine the elemental concentrations of the three elements, again based on the spectrum of each of the individual elements of the three taken in standard boreholes. The use of the five windows gives an overdetermined set of equations (i.e., 5 equations in 3 unknowns) which are statistically enhanced by the use of the count rate data from the extra two energy windows to distinguish this technique from that described in the foregoing paragraph.

A problem which occurs in the use of either of the above referenced prior art techniques is that the measurements of the gamma ray spectra of the unknown earth formations in each instance are compared with standard spectra for each of the individual elements made in standard borehole conditions. That is to say, standard condition borehole spectra are fitted to the spectra obtained in the unknown borehole being measured in each of the above two techniques. The problem arises due to the fact that the borehole conditions in the unknown earth formations being measured may not correspond to the conditions which existed in the standard, or calibration, spectra boreholes. That is to say, if the standard spectra were made with a scintillation detector placed in an eight inch borehole, the effect of the borehole dimensions of casing and mud conditions on unknown spectra taken in, for example, a six or twelve inch borehole could cause variations in the spectrum stripping or fitting techniques. These variations could affect the estimates of the percentage of the three elements sought to be detected by as much as an order of magnitude. The present invention takes into account the differences in borehole sizes, borehole effects, and borehole conditions from the standard gamma ray spectra used for the comparison to the unknown spectra taken in the borehole of interest.

BRIEF DESCRIPTION OF THE INVENTION

A natural gamma ray spectrum of an unknown borehole is compared with individual standard gamma ray spectra of potassium, uranium and thorium in at least four energy ranges or bands. Decay peaks of the three elements are encompassed by four or more energy bands which also will be sensitive to changes in count rate caused by changes in the shapes of the unknown spectrum due to borehole conditions differing from that of the standard or calibration boreholes. A function derived from the gamma ray count rates in the four or more bands is used to dynamically compensate the elemental abundancies of the three elements to be detected in the unknown spectrum for the effects of borehole conditions in the unknown borehole which differ from the standard borehole conditions. In an additional embodiment, predetermined borehole conditions are used as inputs to the system to account for changes in standard spectral shapes due to borehole effects.

In performing the invention, a scintillation type detector within a borehole logging instrument is lowered into an unknown borehole. The gamma ray energy spectrum detected by this scintillation detector is separated into the four or more energy ranges or windows. The count rates in the energy windows, in effect, monitor of the shape of the gamma ray spectrum caused by the differences in the borehole conditions and in the geometry of the unknown borehole compared with the standard borehole conditions and geometry in which the calibration gamma ray spectra have been obtained. The measurements taken in the energy ranges or windows are used to provide, in addition to K-U-Th elemental determinations, correction factors to the stripping constants determined from the standard individual element gamma ray spectra measured in the standard boreholes. When applied to the count rate data of the gamma ray spectra taken in the unknown borehole, these corrections may thus correct for the effects of borehole conditions and geometry in the determination of the elemental constituency of the earth formations penetrated by such a borehole. Such borehole corrections to the standard spectra can also be determined from predetermined nominal inputs relating to borehole constituents.

In addition to improved K-U-Th concentrations, the tool uses the scattered low energy gamma rays from the formation to provide information on photoelectric absorption. Based on initial Monte Carlo calculations and subsequent tool measurements, photoelectric absorption in an uncased well can be observed and used to identify formation lithology, using similar physical principles to those employed in recent lithology/density logging devices. In a cased well, photoelectric absorption in iron masks the formation lithology signal, but in itself is useful for determining the mean thickness of the casing, which is indicative of wear and external or internal corrosion.

The spectra are digitized and accumulated downhole and are transmitted to the surface. The spectra can be recorded on magnetic tape and visually output on the log, as well as being used in the software for the K-U-Th, lithology, and casing thickness determinations.

The toolcase over the detector is composed of a low atomic number (and low density) material, which both facilitates the photoelectric absorption measurements and improves the count rates in the detector in the higher energy K-U-Th spectral region. In very high temperature and pressure applications, a titanium toolcase version of the tool may be used.

The invention may best be understood by reference to the following detailed description thereof when taken in conjunction with the accompanying drawings in which:

BRIEF DESCRIPTION OF THE DRAWINGS

FIG. 1 is a graphical representation illustrating a typical natural gamma ray energy spectrum in a borehole taken with a scintillation detector and showing four approximate energy ranges or "windows" used in the present invention;

FIG. 3 is a graphical representation illustrating digitized spectral data from a cased well;

FIG. 4 is a graphical representation illustrating changes in the shape and intensity of high energy formation spectra due to borehole effects;

FIG. 5 is a graphical representation illustrating the improvement in elemental concentration estimates which results from using borehole compensation;

FIG. 6 is a graphical representation illustrating casing effects on low energy formation spectra;

FIG. 7 is a graphical representation illustrating the functional relation between the casing ratio $R_c$ and the casing thickness $t_{CSG}$;

FIG. 8 is a graphical representation illustrating lithology effects on low energy formation spectra;

FIG. 9 is a graphical representation illustrating borehole diameter correction for the lithology ratio $R_{LIT}$;

FIG. 10 is a graphical representation illustrating borehole salinity correction for the lithology ratio $R_{LIT}$; and FIG. 11 is a graphical representation illustrating the functional relation between the corrected lithology ratio $R'_{LIT}$ and the photoelectric factor $P_e$.

DESCRIPTION OF THE PREFERRED EMBODIMENTS

Figure 2:
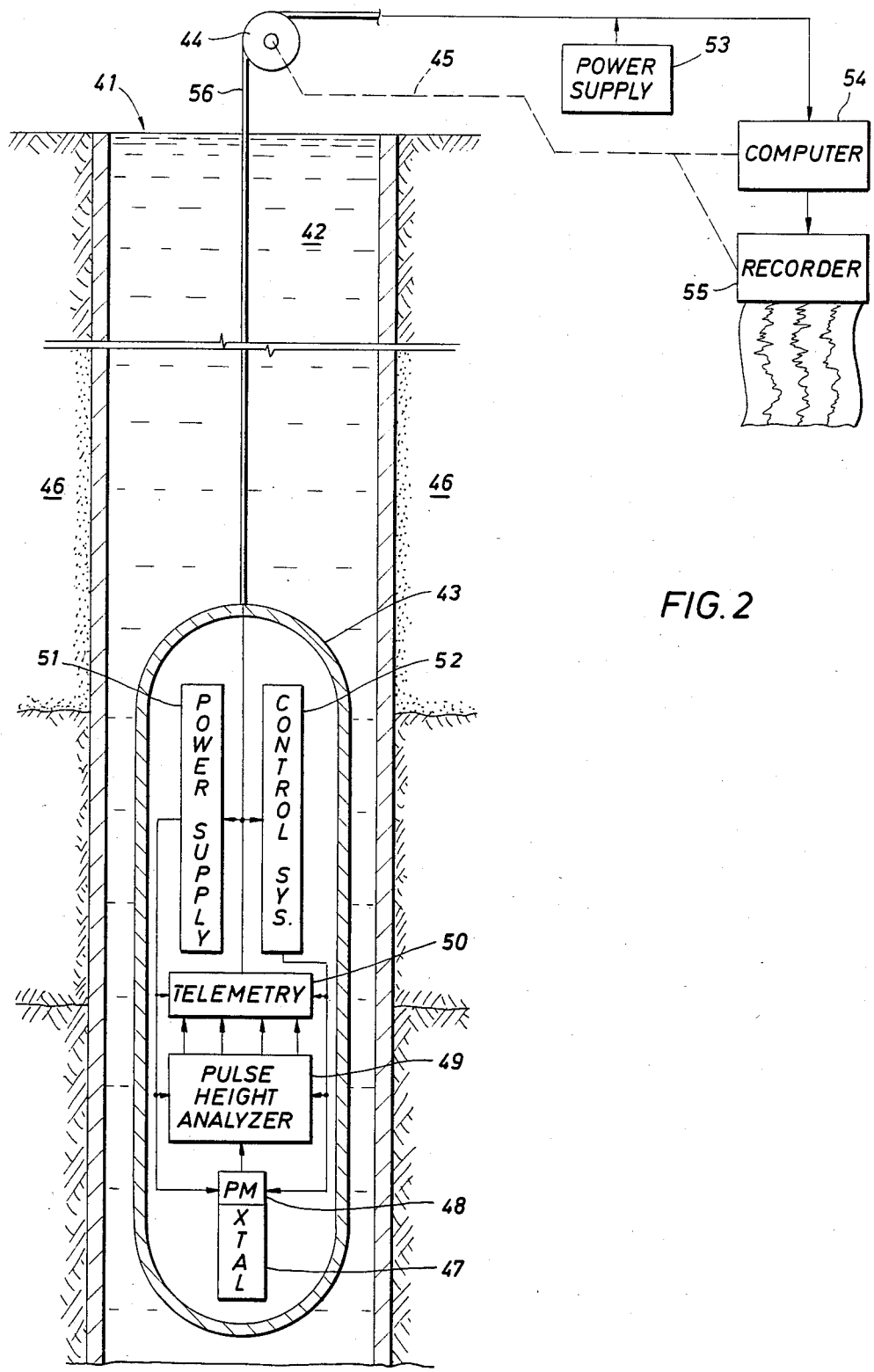
FIG. 2 is a schematic diagram of a well logging system employing the concepts of the present invention.

Logs of natural gamma ray activity in three energy ranges have been used to estimate the potassium (K), uranium (U) and thorium (Th) content of earth formations. These logs (commonly referred to K-U-T logs) were initially used in mineral exploration and bed correlation studies.

During most recent times, however, the K-U-T logs have been used to determine other important information about earth formations penetrated by a well borehole, such as:

(1) the oxidation state of the bed at the time of deposition;

(2) quantity of organic material in sedimentary layers which (together with item 1) leads to source rock bed identification;

(3) the depositional environment of the bed (i.e., continental vs, marine deposition);

(4) water movement in downhole formations which in turn may indicate fractures, faultering, or permeability;

(5) water movement in the borehole region which may indicate channeling or water producing perforations;

(6) more accurate shale content determinations for a particular bed, and;

(7) clay typing and marker bed identification.

Each of the two commercially available services discussed earlier uses scintillation type gamma ray detectors which are biased to record the gamma radiation in either three or five energy bands or windows. Count rate contributions from the decay of each of the elements of interest or their daughter decay products are mathematically stripped or fitted from the composite count rate observed within the three or five energy windows. Elemental concentrations may then be computed from the stripped or fitted count rates. In the second type of commercial logging operation the use of five energy windows provides an overdetermined set of relations which may be used to statistically enhance the count rate information from each of the energy windows. However, no basic change from a comparison of unknown spectra with standard gamma ray spectra taken under standard borehole conditions is contemplated in either of these commercially available techniques.

Changes in borehole conditions can introduce errors in concentration calculations of the elements that can approach an order of magnitude. Such errors, although large, were still tolerable in early applications of the K-U-T log for minerals exploration. However, as the applications of such logs have become more sophisticated, errors of this magnitude are no longer acceptable.

In the present invention, a borehole compensated K-U-T log can be developed by utilizing the response of multiple energy windows which encompass the predominantly Compton scattering and unscattered regions of the measured gamma ray spectrum. The windows monitor the shape of the gamma ray spectrum caused by variations in borehole conditions as well as by variations in elemental K-U-Th concentrations. The response in all the windows are used, via least spuares techniques, to determine the effects of non-standard borehole conditions and also the elemental concentrations of K, U, and Th.

Referring now to FIG. 1, a natural gamma ray spectrum is illustrated schematically in which the gamma ray intensity or count rate is plotted as a function of gamma ray energy over the energy range from 0–3 MeV. Four energy windows contemplated for use according to the present invention are illustrated superimposed on the gamma ray spectrum of FIG. 1. The energy bands or windows labelled window 1, window 2, and window 3 are chosen to include the 2.61, 1.76, and 1.46 MeV gamma radiations from the decay of thorium ($Tl^{208}$), uranium ($Bi^{214}$), and potassium ($K^{40}$) respectively. Window 4 is a lower energy range which includes spectral information from K, U, and Th and also includes Compton scattering effects of the gammas between the source in the formation and the detector in the logging tool. It should be recognized that it may be advantageous to select more than four windows to accomplish the measurements, but four windows are shown in the figures for the sake of ease of understanding.

Regardless of the number of windows selected, it is important to note that the energy range spanned should include both unscattered and Compton scattered gamma rays, but should be insensitive to significant photoelectric absorption effects from borehole and formation elements. The basic response in the energy windows selected according to the teachings of the present invention can be written as $$[C]=[A][M],\quad(38)$$

wherein:

$$[C] = \begin{bmatrix} c_1 \\ c_2 \\ \cdot \\ \cdot \\ c_m \end{bmatrix} \quad [A] = \begin{bmatrix} a_{1,Th}\ a_{1,U}\ a_{1,K} \\ a_{2,Th}\ a_{2,U}\ a_{2,K} \\ \cdot \\ \cdot \\ a_{m,Th}\ a_{m,U}\ a_{m,K} \end{bmatrix} \quad [M] = \begin{bmatrix} M_{TH} \\ M_U \\ M_K \end{bmatrix} \ldots \quad(39)$$

and $c_i$ = the count rate recorded in window i of the gamma ray spectrum (i = 1, ..., m)—counts/sec.

$a_{ij}$ = the sensitivity matrix element for window i and element j (j = Th,U,K)—counts/sec/ppm (Th, U); counts/sec/% (K)

$M_j$ = the elemental concentration oif element j—ppm (Th, U); % (K)

For the four window system depicted in FIG. 1, the above system is solved with i=4.

The sensitivity matrix elements $a_{ij}$ were determined in test formations containing known concentrations of Th, U, and K, with the following borehole conditions:
Borehole diameter: 9 in.
Borehole fluid: fresh water
Borehole casing: none
Tool position: decentralized
These are defined as "standard" borehole conditions.

Elemental concentrations are obtained by solving equation (38) for M using a weighted least squares technique.

BOREHOLE COMPENSATION

As described above, when non-standard borehole conditions are encountered, the shape and intensity of the recorded gamma ray spectrum changes due to variations in the scattering and absorption properties of the borehole. This is illustrated in FIG. 4, which shows high energy spectra in the same formation with uncased, cased, as well as cemented and cased borehole conditions. From FIG. 4 it can be seen that the amount of downscattering, and hence the shape of each spectrum, is directly related to the quantity of material in the borehole. Also observe that the quantity of borehole material affects the count rate in the potassium peak itself, as indicated by the range of normalization factors in the figure. These spectral variations induce changes in the sensitivity matrix of equation (38). The sensitivity matrix must be adjusted for borehole conditions as $M_K$, $M_U$, and $M_{TH}$ are being determined in order to obtain accurate elemental concentration measurements.

A series of test formation measurements was made where borehole conditions were varied using a wide range of casing sizes and weights (with and without cement) and borehole fluids (air, fresh water, saturated salt water, barite mud). For each non-standard borehole condition, a sensitivity matrix [A'] was computed. These data show that the sensitivity matrix elements $a'_{ij}$ for non-standard borehole conditions are related to the corresponding standard borehole matrix elements as:

$$a'_{ij}=a_{ij}F_{ij}(L),\quad(40)$$

where L is a function of the Compton scattering and attenuation properties of the borehole. By definition:

$$F_{ij}(L)=1.00\quad(41)$$

in standard borehole conditions. Elemental concentrations $M_j$ can be determined in any borehole condition by solving:

$$[C]=[A'][M]\quad(42)$$

for M. This can be done using previously described techniques if L is known or can be calculated. L is related to borehole constituents 1,2,3, ..., α having densities $\rho_1,\rho_2,\rho_3,\ldots,\rho_\alpha$, and thicknesses $x_1,x_2,x_3,\ldots,x_{60}$, by the relationship:

$$L=f(\eta),\quad(53)$$

wherein $$\eta = \sum_\alpha \rho_\alpha x_\alpha,$$

and f is a predetermined function.

Since η is predominately a function of borehole parameters (as is L(η)), it is possible to monitor overall borehole conditions using an output curve of η, L(η), or some other function, H(η). If all but one borehole parameter were known to be constant, then changes in η (or a function of η) would imply changes in the remaining variable. For example, if the borehole fluid and casing in a cemented well were unchanging, then changes in η will be related primarily to changes in cement thickness (ignoring the small additional perturbations caused by formation density changes). With a properly calibrated instrument it should be possible to quantify the changing borehole variable. In the event that all borehole variables are constant, then statistically significant η changes will provide a direct measurement of formation density.

Computation of L for Nominal Borehole Conditions

In the preferred embodiment, the quantity L is dynamically computed in field tool software from nominal values of boreholes variables including borehole diameter ($d_{BH}$), mud weight ($W_{MUD}$), and in cased holes, casing diameter ($d_{CSG}$), casing weight ($W_{CSG}$) and the density of the material ($\rho_{ANN}$) in the casing-borehole annulus. Pertinent variables are entered into the logging computer prior to logging. L is calculated from these variables and used to generate an elemental sensitivity matrix [A'] for the specified borehole conditions. This sensitivity matrix is then used in the K-U-Th computations over the interval in the well where these borehole parameters are appropriate.

In cased boreholes, if the logged interval is below the cement top, the density of cement is entered. Above the cement top, the casing-borehole annulus is assumed to be filled with mud unless otherwise specified. If a caliper log is available, this information can be merged with the tool log to obtain a more accurate value for $d_{BH}$. It should be noted that in good borehole conditions, casing parameters dominate the final values of L, and therefore approximations of $W_{MUD}$, $\rho_{ANN}$ and $d_{BH}$ are usually not major sources of error. For open hole logs, $d_{BH}$ can be specified prior to logging or obtained from a caliper log.

The results of active borehole compensation are illustrated in FIG. 5A using $M_U$ as an example. Station measurements were made in test formations containing known concentrations of U, as well as Th and K. Conditions were varied, as specified, from air filled open boreholes to fresh water filled 7 in., 34.7 lb/ft cased boreholes. Concentrations measured using compensation, $M_U^{MEAS}$, are plotted as a function of known concentrations, $M_U^{TRUE}$. Accurate results are obtained over a wide range of borehole conditions. A similar plot is shown in FIG. 5B where no borehole compensation was applied (i.e. standard borehole conditions were assumed.). FIG. 5B illustrates the magnitude of errors that can be encountered if no attempt is made to compensate the K-U-Th spectra for nonstandard borehole conditions.

Note that the uncompensated $M_U$ error does not necessarily vary directly with the scattering/absorbing material within the borehole. This is due to varying concentrations of Th and K within the formations which introduce errors not necessarily proportional to borehole scattering/absorbing material when an erroneous sensitivity matrix is used.

Dynamic Determination of L

When borehole conditions are unknown or vary greatly over the logged interval, L can be determined dynamically in addition to the K, U, and Th values from the shape of the composite spectra. This is a difficult problem since the $F_{ij}(L)$ functions of Eq. (40) are nonlinear, and thus nonlinear techniques are required for the solution. One such technique employs a separable least squares solution of equation (42) using a program such as NL2SOL, as described in a paper "NL2SOL—An Adaptive Non-Linear Least Square Algorithm", by J. E. Dennis, Jr. et al, in ACM TRANSACTIONS on Math. Software, Vol 7, No. 3, September, 1981.

Referring now to FIG. 2, a well logging system in accordance with the concepts of the present invention is illustrated schematically. A well borehole 41 penetrates earth formations 46 and is lined with a steel casing. It will be understood that the invention can also be used in open hole. The borehole 41 contains a well bore fluid 42 to control pressure in subsurface formations. Suspended in the borehole 41 by an armored well logging cable 56 of the conventional type, is a downhole measurement probe or sonde 43 containing instrumentation for measuring gamma ray spectral characteristics of the earth formations 46 penetrated by the borehole 41. Signals from the down hole sonde 43 are conducted to the surface on conductors of the cable 56 and supplied to a surface computer 54 which performs the hereinbefore described signal processing techniques in order to extract the elemental constituents of potassium, uranium and thorium present in the earth formations 46 which are then recorded as a function of borehole depth on the recorder 55. The well logging cable 56 passes over a sheave wheel 44 which is electrically or mechanically coupled (as indicated by a dotted line 45) to the computer 54 and recorder 55 in order to provide depth information about the downhole sonde 43 for the surface recording process. The surface computer 54 may be a model PDP-11 provided by Digital Equipment Corp. of Cambridge, Mass. and can be programmed in a high level language such as FORTRAN to perform the previously described computations and to drive the output displays.

The downhole sonde 43 contains near the lower end thereof a gamma ray detecting system comprising a scintillation crystal 47 and a photomultiplier and amplifier package 48. Power for the operation of the downhole sonde system is supplied from a surface power supply 53 via conductors of the cable 56 to a downhole power supply 51 where it is converted to appropriate voltage levels and supplied to the downhole circuitry components of the system as indicated in FIG. 2. Gamma ray spectral signals are supplied from the photomultiplier tube 48 to a pulse height analyzer 49 where they are separated into count rates in the four or more energy windows hereinbefore described. The pulse height analyzer provides the output signals corresponding to the count rates in each of the energy windows herein described to a telemetry system 50 where the pulse height gamma ray spectral information is converted to an appropriate wave form for transmission to the surface via conductors of the well logging cable 56. Downhole control circuits 51 provide timing pulses to the pulse height analyzer and telemetry system in order to synchronize the transmission at regular data intervals from the downhole sonde 43 to the surface equipment. There synchronization signals are also encoded in the telemetry system 50 and supplied to the surface computer 54.

Thus, naturally occurring gamma rays from the earth formations 46 are detected by the scintillation crystal 47 photomultiplier 48 detector system in the downhole sonde 43, broken down into their energy constituents by the pulse height analyzer 49 and telemetered to the surface by the telemetry system 50 on conductors of the armored well logging cable 56. At the surface, the signals are processed in accordance with the hereinbefore described techniques in order to extract the radioactive elemental constituency of earth formation 46 penetrated by the borehole 41.

In the preferred embodiment the tool incorporates a low atomic number (Z) toolcase section. This configuration permits measurement of casing/lithology in non-barite mud environments, as well as making borehole compensated K-U-Th determinations.

As seen in FIG. 2, the principal detector is a 2 in. $\times$ 12 in. NaI(Tl) crystal and low noise photomultiplier. In close proximity to the large detector is a much smaller crystal (not shown) which contains an embedded Am source that it used for gain stabilization. When Am decays, a 60 KeV gamma ray and a high energy alpha ($\alpha$) particle are emitted essentially simultaneously. The $\alpha$ particle is detected with virtually 100% efficiency in the smaller detector, whereas most of the 60 KeV gamma rays escape. Approximately 20% of these gammas are detected in the large NaI detector. Since these gammas from the stabilizer are in coincidence with $\alpha$'s, they can be isolated from all the other natural gamma rays detected in the large crystal with better than 99% efficiency. This serves two very useful purposes. First the gamma ray coincidence spectrum contains only 60 KeV stabilizer gammas (and crystal induced 30 KeV iodine x-rays), and hence is unaffected by changes in the number or distribution of external gamma rays. This yields much better gain stabilization than previously possible. Second, the anticoincidence spectrum in the NaI crystal contains gamma radiation originating exclusively from the formation, removing the need for stripping out stabilizer counts. As discussed below, this is important since virtually the entire formation gamma ray spectrum is used in the K-U-Th and the casing/lithology measurements.

Both the coincidence and anticoincidence data are digitized in the tool. The coincidence (stabilizer) events are converted into a 256 channel spectrum (see FIG. 3) which spans the energy range from 0–350 KeV. This high resolution is required to enable the automatic downhole gain stabilizer feedback circuit to maintain system gain to approximately ±0.5%. The anticoincidence (formation gamma radiation) events are converted into two spectra; one 256 channel spectrum spans the low energy range from 0–350 KeV, and is used primarily in the photoelectric lithology and casing measurements. The other 256 channel spectrum spans the high energy range 0–3000 KeV, and is used in the borehole compensated K-U-Th determinations.

The three spectra are accumulated in the tool and are transmitted to the surface computer system approximately each 0.23 ft. while logging. A telemetry tape, including spectral information, is recorded at the top of the logging cable, and the two formation spectra (high energy and low energy) are then transferred into the truck computer. The high energy spectrum is currently broken down into 4–12 contiguous energy windows (depending upon borehole conditions and the computational time available), selected to encompass specific peaks from potassium, uranium, and thorium between 150 KeV and 3 MeV. The windows are also selected such that photoelectric absorption is not significant.

In the low energy spectrum, two windows are selected for the casing measurement and two for the lithology measurement. If the well is cased, the lithology windows are not used; if the well is uncased, the casing windows are not used. If the borehole fluid contains barite or other high Z materials, none of the photoelectrically sensitive low energy spectral data is utilized.

The K-U-Th window count rates and the lithology window count rates are processed initially using adaptive filters to improve statistical precision. Changes in the total gamma ray count rate in the high energy spectrum relative to statistical fluctuations are used to determine the amount of filtering applied to all window count rates. Gamma ray count rate changes within calculated statistics result in a heavy filter on the window counts. Changes outside of statistical variations cause shorter effective filtering lengths to be used, with the amount of filtering being inversely related to the degree of divergence from statistics. The net effects are sharp resolution of bed boundaries, and yet good statistical repeatability in zones where count rates are relatively constant.

The casing window count rates are also adaptively filtered, but only the total gamma count rate is used to determine the amount of filtering employed. In high gamma radiation zones less filtering is employed than in zones with low gamma actvity, such that statistical fluctuations in all zones are approximately the same. Vertical casing interval resolution is therefore a function of gamma count rate.

In addition to the log curves described below, the preferred embodiment of the present invention provides for periodically outputting on a film record in real-time the actual low and high energy formation spectra (integrated over a statistically meaningful depth interval). This permits the user to visually ascertain the gain stability of the system and to ensure the absence of noise in the data.

TOOL TEST FORMATIONS

In order to calibrate the tool measurements of K-U-Th, and to calibrate the response of the lithology information obtained with the system, a set of 6 test formations was fabricated to supplement information from existing test formations. Monte Carlo calculations were used to determine the minimum dimensions of these test pits prior to construction. Each formation was six feet in diameter and either 4.0 ft. or 5.0 ft. thick. The upper three zones contain potassium, equilibrated thorium, and equilibrated uranium ores respectively, each blended into an inert silicate concrete matrix. The lower three zones each contain approximately the same mix of K-U-Th, but differ in the equivalent atomic number ($Z_e$) of each inert matrix. This matrix atomic number was varied by using different aggregates (sand, limestone, or dolomite) in the concrete preparation.

All the test formations have 9 in. diameter boreholes, and are isolated from the borehole fluid by a very thin walled low-$Z_e$ liner. The concentrations of the radioactive elements used in these zones are somewhat higher than anticipated in downhole formations. This was done to facilitate calibration, and to better isolate the individual elemental source spectra above the matrix background.

An extensive set of concrete samples was collected during the construction of the zones. Approximately half the samples were sent to two independent laboratories for K, U, and Th analysis using spectrometric radioassay techniques. A subset of these was also analyzed chemically. The results show standard deviations of 1% for the K determination, 14% for U, and 4% for Th. Vertical scans of each zone with the tool show that each element is homogeneously distributed to within 3%. These values reflect the uncertainty in the assays as well as the heterogeneity of the samples.

DETERMINATION OF CASING THICKNESS

In cased wells logged with a tool preferably having a low Z housing, it is possible to obtain a measurement of mean casing thickness, or equivalently casing weight, simultaneously with the K-U-Th measurements.

Naturally radioactive sources within the formation emit a range of gamma ray energies, most of which are Compton scattered to lower energies prior to reaching the vicinity of the detector. This results in essentially continuum energy spectra, as seen by the NaI(T1) detector below about 350 KeV, regardless of source type. In a cased well, these formation gamma rays are attenuated by the casing prior to being observed in the detector. Both Compton scattering and photoelectric absorption (P.E.) can be significant in this attenuation process. Photoelectric absorption is especially important in elements with large atomic numbers (Z) and in low gamma energy ($E_\gamma$) ranges. P.E. can be related to these parameters via the following expression:

$$P.E. \sim Z^{4.6}/E_\gamma^{3.15} \tag{43}$$

Below 150 KeV, total gamma ray attenuation is strongly influenced by photoelectric absorption. Iron casing has a significantly higher Z (equal to 26) than other common elements in borehole fluids, cements, and formations. Therefore, from Eq. (43) it can be concluded that casing should dominate the spectral characteristics below 150 KeV. Above about 200 KeV, Compton scattering, which depends primarily on density, dominates the overall gamma ray attenuation process. In this region of the spectrum, the effects of iron casing relative to other downhole materials are much less pronounced. This concept was first verified with an extensive series of Monte Carlo radiation transport simulations run in 1979. Cased and uncased sand, limestone, and dolomite lithologies were modelled together with realistic tool geometries, including a low Z tool housing. The Monte Carlo results showed the casing effects described above.

The casing effect can be seen in FIG. 6, which shows low energy spectra (0–350 KeV) in the same formation containing different weight casings of the same nominal 7.0 in. outside diameter. Each of these spectra has been normalized at 275 KeV. It is obvious from this figure that a ratio $R_c$ of counts in window A to those in window B will be very sensitive to changes in casing thickness, $t_{csg}$. In fact it is possible to calibrate $R_c$ to provide a quantitative indication of casing thickness, as shown in FIG. 7. In addition to decentralized 7.0 in. casing data, FIG. 7 also shows data for other casing diameters. For geometrical reasons, a given thickness of 5.5 in. casing results in more photoelectric absorption than the same thickness of 7.0 in. casing. Nominal casing diameter, $d_{csg}$, is usually known. Therefore, computer software can easily implement $d_{csg}$ into a calculation of $t_{csg}$ using an expression of the following form:

$$t_{csg} = a(d_{csg}) + b(d_{csg})R_c + c(d_{csg})R_c^2 \tag{44}$$

where a, b, and c are predetermined functions of $d_{csg}$. Also seen in FIG. 7, the casing thickness measurement has better sensitivity in smaller casings.

The significance of several possible systematic errors in the relationship between $R_c$ and $t_{csg}$ have been investigated. These include (1) the effects on $R_c$ of changes in formation K-U-Th source distributions; (2) the effects of changes in borehole fluid salinity; (3) the effects of cement; (4) the effects of changes in formation lithology type; and (5) the effects of asymmetrical casing thickness. Each of these areas is addressed in the following paragraphs.

Effects on $t_{csg}$ of Changes in K-U-Th Source Distribution

Since both thorium and uranium decay series produce gamma rays over wide energy ranges, it might be suspected that changes in source distribution could significantly effect $R_c$, and thus the computed value, $t_{csg}$. Table 1 shows data for two 7 in. casings in the individual K, U, and Th test formation zones. In the Table, $\Delta t_{csg}$ is the difference in apparent casing thickness for different source distributions relative to potassium. From this tabular data it can be seen that source effects on $t_{csg}$ are very minimal when compared to the useful dynamic range of the casing thickness measurement, especially for normally encountered casing thicknesses. No correction to $t_{csg}$ is presently being made in field software for variations in source distribution, since this error is smaller than other sources of uncertainty in $t_{csg}$ (such as statistical errors). A source distribution correction can be made in extreme accuracy applications when stationary measurements are collected, since the source distribution is obtained simultaneously from the K-U-Th elemental concentration measurements.

Effects on $t_{csg}$ of Changes in Borehole Fluid Salinity

Since the effective atomic number, $Z_e$, of casing fluids is generally much less than casing, photoelectric casing effects would be expected to dominate effects due to borehole salinity. To test this hypothesis, $R_c$ was measured in test formations containing the same casings filled with both fresh water and 150 Kppm NaCl salt water. The results are presented in Table II. In this table $\Delta t_{csg}$ is defined as:

$$\Delta t_{csg} = t_{csg}^{SW} - t_{csg}^{FW}, \tag{45}$$

where $t_{csg}^{SW}$ and $t_{csg}^{FW}$ are the apparent thicknesses calculated from measured $R_c$ values with sale and fresh water in the casing, respectively. Since the basic response curves shown in FIG. 7 were developed with fresh boreholes, $\Delta t_{csg}$ represents the error in $t_{csg}$ with saline borehole fluids. From Table II it can be seen that salinity errors are virtually negligible. If, however, high $Z_e$ fluids are present inside the casing (such as barite), $R_c$ will be dominated by these elements rather than iron, and $R_c$ cannot be used to accurately predict $t_{csg}$.

Effects on $t_{csg}$ of Cement Outside Casing

Since most cements have $Z_e$ values substantially lower than casing, it would be expected that cement would also constitute a minor perturbation to $R_c$ and hence to $t_{csg}$. The $Z_e$ of cement is, however, closer to that of iron than most casing fluids. Therefore, a series of tests was conducted to quantify cement effects on $t_{csg}$. One set of data was collected in two essentially identical test formations, one containing a 10 in. borehole and a type-H cemented 5.5 in., 14 lb/ft casing, the other containing a 6 in. borehole and an uncemented 5.5 in., 14 lb/ft casing. Data were also taken with several type A and H cement thicknesses on 5.5, 7.0, and 8.625 in. casings in other K-U-Th test formations. Illustrative results are given in Table III where $d_{csg}$ and $d_{BH}$ are the casing and borehole diameters (cement in annulus), $t_{csg}^{true}$ and $t_{csg}^{ant}$ are the actual and calculated (FIG. 7) casing thickness, and $\Delta t_{csg}$ is the thickness error. From these results it can be seen that there is a slight systematic trend toward greater apparent casing thickness in cemented boreholes.

Considering the small and consistent nature of the error, the effects of cement will generally be small if one assumes a nominal 0.015 in. correction to $t_{csg}$ in cemented wellbores. If the cement used contains high $Z_e$ additives, the above correction can be inadequate, resulting in a slight overestimate of casing thickness.

Effects of Changes in Formation Lithology

Different formation matrix types have different $Z_e$ values. However, for all common lithologies, $Z_e$ is considerably less than that of iron. Changes in lithology, except for extremely thin walled casings would not be expected to significantly alter $R_c$ and thus $t_{csg}$. The three K-U-Th test formations with similar source distributions but different $Z_e$ were used to quantify lithology effects on $t_{csg}$. Several casings filled with fresh water were lowered sequentially into these formations, and the effects on $R_c$ for each casing were observed. Table IV illustrates the results, where $\Delta t_{csg}$ values were obtained from $R_c$ using FIG. 7. In the table, $$\Delta t_{csg}{}^x = t_{csg}{}^{z=x} - t_{csg}{}^{z=13.1}, \quad (46)$$

where x=14.4 or 15.4. From these data it can be seen that $\Delta t_{csg}$ errors are essentially negligible for common downhole lithologies and casing thicknesses. However, in the limit where $t_{csg}$ approaches zero, $\Delta t_{csg}$ is in effect a lithology $Z_e$ ratio, similar to the one discussed in the following section.

It should be noted that if high $Z_e$ minerals are present in the formation in sufficient concentrations that the formation $Z_e$ approaches that of the casing, $t_{csg}$ can appear slightly thicker than the true value.

Effects of Azimuthal Variations in Casing Thickness

The tool may not be collimated azimuthally and may normally run decentralized. If the casing in the well is not worn or corroded symmetrically, such a tool will sometimes be in contact with the thin side of the casing, and sometimes the thick side of the casing. Two potential systematic errors must be addressed. First, how much difference will be observed in $R_c$ when the tool is in contact with the thin vs. thick side of the casing? Second, is $R_c$ in a uniform thickness casing systematically different from $R_c$ in an asymmetrically worn casing of the same weight?

To investigate these questions, a section of 7 in., 26.5 lb./ft. casing with a nominal wall thickness of 0.375 in. was machined off center so that one wall was not affected while the opposite wall thickness was reduced by 80% to 0.076 inches. The "average" wall thickness, $t_{csg}{}^{ave}$, was calculated from the weight of the casing before and after machining to be about 0.215 in. $R_c$ was measured in test formations with the tool against both the thin and thick walls of this casing. Table V presents nominal casing diameter and weight, and apparent thickness, $t_{csg}{}^{meas}$, obtained from FIG. 7 using measured $R_c$ values, together with the known $t_{csg}{}^{true}$ values at the point of contact of the tool with the casing. The data indicate that the response of the measurement if very symmetric, i.e. only a slight difference in apparent thickness is observed when the tool is in contact with vastly different thickness areas on the casing. This implies that, to a large degree, gamma rays entering all points around the casing contribute similarly to the $t_{csg}$ measurement, not just the gamma radiation entering the casing at the point of contact with the tool. In this sense $t_{csg}$ is more indicative of average thickness (i.e. weight). Small thin areas or perforations in an otherwise uniform casing will not be adequately resolved, even if the tool contacts the thin area directly.

Also seen in Table V, the calculated casing thickness (regardless of point of contact) is about 25% less than the true average casing thickness. This implies that, in a badly asymmetrically worn casing, the casing thickness indicated will be slightly less than the average thickness. The closer the casing is to symmetric in thickness, the closer the indicated thickness will be to the correct average value. Only for extremely asymmetric sections (like the one used for these tests) will nonuniformity be significant. Also, iron removal on either the outside or inside of the casing is measured equally well, but thickness or weight loss based on external corrosion carries an implicit assumption that this corroded iron is removed from the vicinity of the borehole. In intervals where this assumption is not valid, true external casing corrosion can be greater than that indicated on the log.

DETERMINATION OF FORMATION LITHOLOGY

If a tool having a low $Z_e$ toolcase is used to log an uncased well in which the mud does not contain high $Z_e$ additives (i.e. barite or hematite), it is possible to measure formation lithology type. The same photoelectric absorption principle is used to make the lithology measurement as is used to make the casing thickness measurement. It is also the same principle (photoelectric factor) employed in lithology/density type tools. Scattered gamma rays from the formation, whether of natural origin or induced by a source in a logging tool, must undergo both Compton scattering and photoelectric absorption prior to reaching the detector. As described earlier, photoelectric absorption is effective only at low gamma ray energies and is dominated by the highest $Z_e$ constituent in the formation and borehole. With no casing in the hole, the most abundant high atomic number element is calcium (Z =20). Hence limestone, dolomite, and sand can be differentiated photoelectrically, primarily because each has a different calcium concentration (and hence $Z_e$). Photoelectrically sensitive lithology measurements were first simulated in a downhole natural gamma ray logging environment in the same 1979 series of Monte Carlo calculations used to verify the tool casing thickness measurement. The lithology sensitivity observed between sand, limestone, and dolomite with the Monte Carlo program was in good agreement with the results described below.

FIG. 8 shows low energy range spectra in high, intermediate, and low $Z_e$ formations having identical borehole conditions and similar source distributions. From FIG. 8 it can be seen that below about 100 KeV, and especially in energy Window C, lithology effects are significant. Above about 125 KeV, pholoelectric absorption effects are minimal, and the spectra have similar shapes. The spectra in FIG. 8 have been normalized in energy Window D where photoelectric effects are negligible relative to Compton scattering. A ratio, $R_{LIT}$, of count rates in Window D relative to Window C will clearly be a function of $Z_e$. It should be noted that these energy ranges are slightly different from those used in defining the casing ratio, $R_c$, since the $Z_e$ range of interest is also different.

Because similar photoelectric factor measurements can be made with the low Z tool and lithology/density tools, the same generic nomenclature has been adopted below to avoid confusion. The quantity $P_e$, defined as the formation effective photoelectric absorption cross section, is related to $Z_e$ as $$P_e = (Z_e/10)^{3.6} \quad (47)$$

The energy dependence in the photoelectric absorption reaction is implicit in $P_e$ since preselected energy ranges will be used. $P_e$, when combined with porosity ($\phi$) and bulk density ($\rho_B$), yields $U_{MA}$, the volumetric matrix photoelectric absorption cross section. $U_{MA}$ obtained from the low Z tool system is used to identify formation lithology.

The relationship between $R_{LIT}$ and $P_e$ is more sensitive to changes in borehole parameters than is the photoelectric relationship between $R_c$ and casing thickness, $t_{csg}$. This occurs because the $Z_e$ contrast between the formation and the interfering borehole constituents is not as great as the casing-borehole contrast. Hence $R_{LIT}$ must be corrected for environmental effects prior to use in computing $P_e$.

Determination of $e$ from $R_{LIT}$

In order to compute $P_e$, $R_{LIT}$ must first be corrected for (1) borehole diameter, $d_{BH}$; (2) borehole salinity, $C_{BH}$; and (3) source distribution within the formation. From a large set of test formation data it has been observed that $P_e$ can be expressed as $$P_e = a(s) + b(s) \cdot R'_{LIT} + c(s) \cdot (R'_{LIT})^2, \qquad (48)$$

where a(s), b(s), c(s) = calibration terms which are functions of s s = source type factor reflecting the relative concentration of K to other radioactive elements in the formation $R'_{LIT} = F(d_{BH})F(C_{BH}, d_{BH})R_{LIT}$ $F(d_{BH})$ = borehole diameter correction $F(C_{BH}, d_{BH})$ = borehole salinity (or mud weight) correction $R_{LIT} = C_p/C_c$, the measured lithology ratio from the tool $C_p$, $C_c$ = count rates recorded in windows $W_p$ and $W_c$, respectively.

All of these corrections are preferably defined with respect to the response of the system in standard borehole conditions: $d_{BH} = 9.0$ in., $C_{BH} = 0$ Kppm NaCl (mud weight = 8.4 lb/gal.), and s = 1.0 (i.e. the only radioactive element within the formation is potassium). At standard conditions, $F(d_{BH}) = F(C_{BH}, d_{BH}) = 1.0$.

1. Borehole Diameter Correction $R_{LIT}$ was measured in five sets of test formations, with each set having borehole diameters varying from 6 in. to 10 in., all boreholes containing fresh water. Each different set of formations had different source distributions, but within a given set the source distribution was the same. For each formation, $F(d_{BH}) = R_{LIT}(d_{BH} = 9.0 \text{ in.})/R_{LIT}(d_{BH})$ was computed, and is plotted as a function of $d_{BH}$ in FIG. 9. The curve in FIG. 9 fitted through the data points is represented by an equation of the form $$F(d_{BH}) = a + b \cdot d_{BH} + c \cdot d_{BH}^2, \qquad (49)$$

where a, b, and c are predetermined constants.

2. Borehole Salinity (Mud Weight) Correction

The borehole salinity, or mud weight, correction is a function of both $C_{BH}$ and $d_{BH}$, since the amount of salt in the borehole is a function both of borehole size and salinity. $R_{LIT}$ was measured in a variety of formations with $d_{BH}$ from 6 in. to 10 in. and $C_{BH}$ ranging from 0 to 250 Kppm NaCl. For each borehole diameter, $F(C_{BH}, d_{BH}) = _{IT}(C_{BH} = 0, d_{BH})/R_{LIT}(C_{BH}, d_{BH})$ was computed and plotted as a function of $C_{BH}$ in FIG. 10. Mathematically, $F(C_{BH}, d_{BH})$ can be expressed as:

$$F(C_{BH}, d_{BH}) = 1.0 + b(d_{BH})C_{BH} + c(d_{BH}) C_{BH}^2, \qquad (50)$$

where $b(d_{BH})$ and $c(d_{BH})$ are predetermined quadratic functions of $d_{BH}$. Equivalent salinity can be approximated from the mud weight, $W_{MUD}$, using $$C_{BH} = -1370 + 163.1 W_{MUD}, \qquad (51)$$

where $W_{MUD}$ is in lb./gal.

It should be noted that if high $Z_e$ additives such as barite or hematite are present in the borehole, no mud weight correction can be made since the measured $P_e$ is dominated by these additives.

3. Source Distribution Correction

For $K^{40}$, which emits a single monoenergetic gamma ray, we have observed that $P_e$ is approximately a linear function of $R_{LIT}$. For U and Th, whose daughter elements emit complex gamma ray spectra, we have experimentally observed that the inverse relationship between $P_e$ and $R_{LIT}$ is (a) more non-linear, and (b) essentially identical for both U and Th. It is necessary, therefore, to correct $R_{LIT}$ for changes in the concentration of K relative to U and Th.

A source factor, s, derived from extensive test formation data, reflects the fractional concentration of K in the formation:

$$s = \alpha_K M_K / (\alpha_{Th} M_{Th} + \alpha_U M_U + 'K M_K), \qquad (52)$$

where $M_K$, $M_U$, $M_{TH}$ are the concentrations of K(%), U(ppm), Th(ppm) obtained from the simultaneously derived K-U-Th measurement. The α coefficients in Eq. (53) are used to normalize the relationship between count rate and concentration for each element.

FIG. 11 shows a plot of $(R'_{LIT})$ for various test formations plotted as a function of $P_e$, where $R'_{LIT}$ is the measured $R_{LIT}$ corrected for previously defined borehole diameter and salinity effects. The number in parenthesis for each formation indicates s. The curves in FIG. 11 represent constant s values. $P_e$ can be computed from $R'_{LIT}$ and s using an equation of the form of Eq. (49).

General Comments on $R_{LIT}$ and $P_e$

Although there are several corrections in converting $R_{LIT}$ to $P_e$, they are usually either well defined (salinity/mud weight), easily measurable ($d_{BH}$), or are in general small (s). In fact $R_{LIT}$ observed on the log can often be used directly for qualitative lithology identification, especially if automatic hole size/salinity corrections are made.

It should also be noted that the $P_e$ obtained from the low Z tool log, although similar in concept, can appear different from the $P_e$ obtained from a lithology/density log. In general, the low Z tool derived $P_e$ will not be statistically as accurate as the $P_e$ from the density log, since the measured count rates from natural activity are lower than those obtained when a density source is used. The low z tool lithology signal is also smaller (i.e. $R_{LIT}$ will change fractionally less for a given lithology change). This occurs in part because the low Z tool lithology response is symmetric, and some signal is lost in penetrating the borehole fluid. The $R_{LIT}$ curve from a density tool will require less borehole correction since the pad is collimated out directly through the point of contact with the formation.

A major feature of the low Z tool lithology measurement is that it samples a relatively large formation volume around the entire borehole circumference. It is not sensing just a very small area similar to the area where a density pad detector collimation slot contacts the rock surface. Hence crossplots or calculations involving $P_e$ data from the tool system and neutron or sonic data can be more meaningful since relatively symmetric responses are observed by all. Comparison of density derived and low Z tool derived $P_e$ values can be useful in qualitatively indicating formation heterogeneity.

The foregoing description may make other alternative arrangements according to the concepts of the present invention apparent to those skilled in the art. The aim of the appended claims therefore is to cover all such changes and modifications as are truly within the scope of the invention.

TABLE I
EFFECTS OF SOURCE DISTRIBUTION ON $t_{CSG}$

| $d_{CSG}$ (in.) | $W_{CSG}$ (lb./ft.) | $t_{CSG}^{TRUE}$ (in.) | $\Delta t_{CSG}^*$ (100% U) (in.) | $\Delta t_{CSG}^*$ (100% Th) (in.) |
|---|---|---|---|---|
| 7.0 | 5.55 | 0.075 | −0.013 | −0.021 |
| 7.675 | 24.0 | 0.300 | −0.005 | −0.013 |
| 7.0 | 34.7 | 0.500 | +0.023 | +0.014 |

*$t_{CSG}$ calibrated assuming 100% potassium source

TABLE II
EFFECTS OF BOREHOLE SALINITY ON $t_{CSG}$

| $d_{CSG}$ (in.) | $W_{CSG}$ (lb./ft.) | $t_{CSG}^{TRUE}$ (in.) | $t_{SCG}^{AV}$ (in.) | $t_{CSG}^{SW*}$ (in.) | $\Delta t_{CSG}$ (in.) |
|---|---|---|---|---|---|
| 5.5 | 3.77 | 0.065 | 0.069 | 0.068 | −0.001 |
| 5.5 | 14.02 | 0.250 | 0.245 | 0.236 | −0.008 |
| 7.0 | 5.55 | 0.075 | 0.089 | 0.099 | +0.010 |

*Water salinity = 150 Kppm NaCl.

TABLE III
EFFECTS OF CEMENT ANNULUS ON $t_{CSG}$

| $d_{CSG}$ (in.) | $d_{BH}$ (in.) | $W_{CSG}$ (lb./ft.) | $t_{CSG}^{TRUE}$ (in.) | $t_{CSG}^{CMT}$ (in.) | $\Delta t_{CSG}$ (in.) |
|---|---|---|---|---|---|
| 5.5 | 6.0 | 14.02 | 0.250 | 0.245 | −0.005 |
| 5.5 | 10.0 | 14.02 | 0.250 | 0.260 | +0.010 |
| 5.5 | 9.0 | 14.02 | 0.250 | 0.259 | +0.009 |
| 8.625 | ~13 | 20.0 | 0.220 | 0.240 | +0.020 |

TABLE IV
EFFECTS OF FORMATION LITHOLOGY ($Z_e$) ON $t_{CSG}$

| $d_{CSG}$ (in.) | $W_{CSG}$ (lb./ft.) | $t_{CSG}^{TRUE}$ (in.) | $t_{CSG}^{Ze=13.1}$ (in.) | $t_{CSG}^{Ze=14.4}$ — $t_{CSG}^{Ze=13.1}$ (in.) | $t_{CSG}^{Ze=15.4}$ — $t_{CSG}^{Ze=13.1}$ (in.) |
|---|---|---|---|---|---|
| 7.0 | 5.55 | 0.075 | 0.070 | 0.016 | 0.018 |
| 7.25 | 18.7 | 0.250 | 0.248 | 0.007 | 0.012 |
| 7.0 | 34.7 | 0.500 | 0.502 | 0.002 | 0.009 |

TABLE V
EFFECTS OF CASING THICKNESS ASYMMETRY ON $t_{CSG}$

| $d_{CSG}$ (in.) | $W_{CSG}$ (lb./ft.) | $t_{CSG}^{TRUE}$ (in.) | $t_{CSG}^{MEAS}$ (in.) | $t_{CSG}^{AVG}$ (in.) |
|---|---|---|---|---|
| 7.0 | 26.53 | 0.375 | 0.385 | 0.375 |
| ~7.0 | ~15.2 | 0.375* | 0.167 | ~0.22 |
| ~7.0 | ~15.2 | 0.076* | 0.150 | ~0.22 |

*Casing thickness at tool/casing contact point. Original 7.0 in., 26.53 lb./ft. casing machined off center such that the maximum thickness was unchanged and the minimum thickness was ~0.076 in.

TABLE VI
PARAMETERS FOR COMPUTED BOREHOLE COMPENSATION

| INTERVAL | $d_{CSG}$ (in.) | $W_{CSG}$ (lb./ft.) | $d_{BH}$ (in.) | $W_{MUD}$ (lb./gal.) | $\rho_{ANN}$ (gm/cm$^3$) |
|---|---|---|---|---|---|
| X852–X908 | 7⅝ | 26.4 | 9.75 | 9.3 | 2.0 |
| X908–X104 | 7⅝ / 5½ | 26.4 / 15.5 | 9.75 | 9.3 | 2.0 |
| X104–X148 | 5½ | 15.5 | 6.75 | 9.3 | 2.0 |

TABLE VII
LITHOLOGY DETERMINATION FROM THE LOG

| ZONE | $R_{LIT}$ | $d_{BH}$ (in.) | $M_{TH}$ (ppm) | $M_U$ (ppm) | $M_K$ % | S | $P_e$ (b/e) | $\rho_b$ (gm/cm$^3$) | $\phi$ (%) | $\rho_G$ (gm/cm$^3$) | $U_{MA}$ (b/cm$^3$) |
|---|---|---|---|---|---|---|---|---|---|---|---|
| A | 1.61 | 7.0 | 6.0 | 1.7 | 2.0 | 0.74 | 1.35 | 2.510 | 8.3 | 2.647 | 3.6 |
| B | 2.17 | 6.8 | 1.0 | 1.0 | 1.0 | 0.70 | 4.70 | 2.715 | 0.5 | 2.724 | 12.9 |
| C | 1.92 | 6.9 | 1.0 | 0.5 | 0.5 | 0.70 | 2.90 | 2.850 | 0.2 | 2.850 | 8.4 |

We claim:

1. A method for natural gamma ray spectral logging of a well borehole to determine the relative elemental abundancies of uranium, potassium, and thorium gamma rays in earth formations by comparison with standard gamma ray calibration spectra of uranium, potassium, and thorium taken in standard boreholes having standard geometrical and constituent properties, comprising the steps of:

(a) obtaining with a borehole measurement system an unknown gamma ray energy spectrum in a measurement borehole having non-standard borehole conditions, said unknown gamma ray spectrum comprising gamma ray intensities measured in at least four energy bands corresponding to a first energy band containing the 2.61 MeV thorium decay peak, a second energy band containing the 1.76 MeV uranium decay peak, a third energy band containing the 1.46 MeV potassium decay peak, and one or more additional energy bands for monitoring the shape of said unknown gamma ray spectrum as a function of elemental concentrations and borehole conditions, (b) deriving an elemental sensitivity matrix from borehole condition information supplied by a source other than the detector, and (c) combining said sensitivity matrix and said gamma ray intensity information in said at least four energy bands to derive elemental abundancies of potassium, uranium, and thorium.

2. The method of claim 1 further comprising repeating said steps at different depth levels in the well borehole and recording said derived elemental abundancies as a function of the borehole depths.

3. The method of claim 1 wherein said step of obtaining a gamma ray energy spectrum includes obtaining a low energy photoelectric spectrum measurement, and, in open hole measurements, further comprising deriving from said measurements an indication of the formation lithology.

4. The method of claim 1 wherein said step of obtaining a gamma ray energy spectrum includes obtaining a low energy photoelectric spectrum measurement, and, in cased hole measurements, further comprising deriving from said measurements an indication of the casing thickness in the borehole.

5. The method of claim 1 further comprising processing the count rates in the energy bands using adaptive filters to improve statistical precision, and adjusting the filtering lengths according to changes in the gamma ray count relative to statistical fluctuations, such that the amount of filtering is inversely related to the degree of divergence from statistics, to provide sharp resolution of bed boundaries, and to provide good statistical repeatability in zones where count rates are relatively constant.

6. A method for natural gamma ray spectral logging of a well borehole to determine the relative elemental abundancies of uranium, potassium, and thorium gamma rays in earth formations by comparison with standard gamma ray calibration spectra of uranium, potassium, and thorium taken in standard boreholes having standard geometrical and constituent properties, comprising the steps of:
(a) obtaining with a borehole measurement system an unknown gamma ray energy spectrum in a measurement borehole having non-standard borehole conditions, said unknown gamma ray spectrum comprising gamma ray intensities measured in at least three energy bands corresponding to a first energy band containing the 2.61 MeV thorium decay peak, a second energy band containing the 1.76 MeV uranium decay peak, a third energy band containing the 1.46 MeV potassium decay peak said energy bands also being used for monitoring the shape of said unknown gamma ray spectrum as a function of elemental concentrations and borehole conditions,
(b) deriving an elemental stripping constant from borehole condition information supplied by a source other than the detector, and
(c) combining said stripping constants and said gamma ray intensity information in said at least three energy bands to derive elemental abundancies of potassium, uranium, and thorium.

7. The method of claim 2 further comprising repeating said steps at different depth levels in the well borehole and recording said derived elemental abundancies as a function of the borehole depths.

8. The method of claim 2 wherein said step of obtaining a gamma ray energy spectrum includes obtaining a low energy photoelectric spectrum measurement, and, in open hole measurements, further comprising deriving from said measurements an indication of the formation lithology.

9. The method of claim 2 wherein said step of obtaining a gamma ray energy spectrum includes obtaining a low energy photoelectric spectrum measurement, and, in cased hole measurements, further comprising deriving from said measurements an indication of the casing thickness in the borehole.

10. The method of claim 2 further comprising processing the count rates in the energy bands using adaptive filters to improve statistical precision, and adjusting the filtering lengths according to changes in the gamma ray count relative to statistical fluctuations, such that the amount of filtering is inversely related to the degree of divergence from statistics, to provide sharp resolution of bed boundaries, and to provide good statistical repeatability in zones where count rates are relatively constant.

11. A method for natural gamma ray spectral logging of a well borehole to determine the relative elemental abundancies of uranium, potassium, and thorium gamma rays in earth formations by comparison with standard gamma ray calibration spectra of uranium, potassium, and thorium taken in standard boreholes having standard geometrical and constituent properties, comprising the steps of:
(a) obtaining with a borehole measurement system an unknown gamma ray energy spectrum in a measurement borehole having non-standard borehole conditions, said unknown gamma ray spectrum comprising gamma ray intensities measured in at least four energy bands corresponding to a first energy band containing the 2.61 MeV thorium decay peak, a second energy band containing the 1.76 MeV uranium decay peak, a third energy band containing the 1.46 MeV potassium decay peak, and one or more additional energy bands for monitoring the shape of said unknown gamma ray spectrum as a function of elemental concentrations and borehole conditions, the one or more additional energy bands including a low energy photoelectric spectrum measurement.
(b) processing the count rates in the energy bands using adaptive filters to improve statistical precision, and adjusting the filtering lengths according to changes in the gamma ray count relative to statistical fluctuations, such that the amount of filtering is inversely related to the degree of divergence from statistics, to provide sharp resolution of bed boundaries, and to provide good statistical repeatability in zones where count rates are relatively constant,
(c) deriving an elemental sensitivity matrix from borehole condition information supplied by a source other than the detector,
(d) combining said sensitivity matrix and said gamma ray intensity information in said at least four energy bands to derive elemental abundancies of potassium, uranium, and thorium,
(e) in open hole measurements, deriving from the measurements an indication of the formation lithology,
(f) in cased hole measurements, deriving from the measurements an indication of the casing thickness in the borehole, and
(g) repeating said steps at different depth levels in the well borehole and recording said derived elemental abundancies as a function of the borehole depths.

* * * * *